United States Patent [19]

Hashida et al.

[11] Patent Number: 5,375,506
[45] Date of Patent: Dec. 27, 1994

[54] HYDRAULIC PRESSURE CONTROL APPARATUS

[75] Inventors: Koichi Hashida; Masato Yoshino, both of Itami, Japan

[73] Assignee: Sumitomo Electric Industries, Ltd., Osaka, Japan

[21] Appl. No.: 88,346

[22] Filed: Jul. 9, 1993

[30] Foreign Application Priority Data

Jul. 13, 1992 [JP] Japan .................................. 4-185106
May 24, 1993 [JP] Japan .................................. 5-121735

[51] Int. Cl.⁵ ........................ F15B 11/08; B60T 13/00
[52] U.S. Cl. ..................................... 91/446; 91/454; 91/459; 60/547; 60/581
[58] Field of Search ................. 91/459, 521, 446, 447, 91/450, 451, 454, 465; 60/536, 581, 547.1

[56] References Cited

U.S. PATENT DOCUMENTS

| | | | |
|---|---|---|---|
| 3,260,164 | 7/1966 | Guentner et al. | 91/465 |
| 4,624,108 | 11/1986 | Leiber | 60/581 X |
| 4,641,895 | 2/1987 | Belart et al. | 60/547.1 X |
| 4,783,128 | 11/1988 | Resch | 60/547.1 X |
| 4,828,338 | 5/1989 | Ocvirk et al. | 60/547.1 X |
| 4,966,420 | 10/1990 | Schiel et al. | 60/547.1 X |
| 5,211,196 | 5/1993 | Schwelm | 91/454 X |

FOREIGN PATENT DOCUMENTS

| | | |
|---|---|---|
| 0363845 | 9/1950 | European Pat. Off. . |
| 0526839 | 2/1953 | European Pat. Off. . |
| 0341986 | 11/1989 | European Pat. Off. . |
| 4121471 | 1/1952 | Germany . |
| 63-061671 | 3/1988 | Japan . |
| 03223578 | 10/1991 | Japan . |
| 03234987 | 10/1991 | Japan . |

OTHER PUBLICATIONS

English Language Abstract of Japanese Laid-Open Publication No. 3-234,987. Oct. 1991.
English Language Abstract of Japanese Laid-Open Publication No. 3-233,578. Oct. 1991.
English Language Abstract of Japanese Laid-Open Publication No. 63-61,671. Mar. 1988.

Primary Examiner—Edward K. Look
Assistant Examiner—Hoang Nguyen
Attorney, Agent, or Firm—Sandler, Greenblum & Bernstein

[57] ABSTRACT

A hydraulic pressure control apparatus comprising: an introducing valve provided on a supply duct connecting to each other a hydraulic source and a control chamber for controlling a fluid-operated equipment or increasing or decreasing the hydraulic pressure of the fluid-operated equipment; and a discharge valve provided on a discharge duct discharging hydraulic fluid from the fluid-operated equipment or the control chamber. The introducing valve and/or the discharge valve are disposed in series on the supply duct or the discharge duct; at least one of a plurality of the introducing valves and/or the discharge valves consists of a flow rate-variable valve capable of changing the flow rate of the hydraulic fluid continuously according to the intensity of electric current; and the other introducing valves and/or discharge valves consist of electromagnetic change-over valves fully opened or fully closed.

13 Claims, 9 Drawing Sheets

HYDRAULIC PRESSURE CONTROL APPARATUS

BACKGROUND OF THE INVENTION

1. Field of the Invention

The present invention relates to a hydraulic pressure control apparatus and more particularly to a hydraulic pressure control equipment such as a steering device, a suspension or the like installed on a car and in particular, a hydraulic pressure control apparatus, comprising a flow rate-variable valve for preventing the leakage of hydraulic fluid, preferably used as a braking liquid control apparatus such as an antilock braking fluid pressure control apparatus, a traction control braking fluid pressure control apparatus or the like.

2. Description of the Related Arts

Various flow rate-variable valves suitable for a hydraulic pressure control apparatus have been proposed. Description is made on the flow rate-variable valves proposed by the present applicant and disclosed in the Japanese Patent Laid-Open Publications Nos. 3-234987 and 3-223578.

Referring to FIG. 10, the flow rate-variable valve disclosed in the Japanese Patent Laid-Open Publication No. 3-234987 is described below. A sleeve 1 accommodates a spool 2 which is slidable in the sleeve 1. A duct 2B including an orifice 2A is disposed in the spool 2 to be urged by a spring 3 and an electromagnet (not shown). A passage 2C communicating with the duct 2B is formed on the surface of the spool 2.

The flow rate of the orifice 2A is determined by the difference in the pressure between one side of the orifice 2A communicating with an inlet port 1A and the other side thereof communicating with an outlet port 1B. The pressure difference depends on the urging force applied to the spool 2 by the spring 3 and the electromagnet. The spool 2 slides in the sleeve 1, thus communicating the inlet port 1A with the passage 2C or cutting the communication therebetween repeatedly to form a variable orifice. The variable orifice maintains the difference in the pressure between both sides of the orifice 2A. Therefore, in the flow rate-variable valve, the intensity of electric current is adjustably supplied to the electromagnet to change the urging force applied to the spool 2 by the spring 3 and the electromagnet. In this manner, the flow rate of the hydraulic fluid flowing from the inlet port 1A to the outlet port 1B can be successively controlled.

In the flow rate-variable valve disclosed in the Japanese Patent Laid-Open Publication No. 3-223578, as shown in FIG. 11, a groove 2D is formed on the peripheral surface of the spool 2 to be urged by an electromagnet (not shown), and a shoulder 2E of the spool 2 engages an annular sealing member 5 into which the groove 2D has been inserted. In this manner, a variable orifice is formed.

In the flow rate-variable valve of FIG. 11, the shoulder 2E is brought into close contact with the annular sealing member 5 or move away therefrom, thus communicating the inlet port 1A with a passage 2B of the spool 2 or cutting the communication therebetween repeatedly to form a variable orifice. The variable orifice maintains the difference in the pressure between both sides of the orifice 2A. Therefore, in the flow rate-variable valve, the intensity of electric current is adjustably supplied to the electromagnet to change the urging force applied by the electromagnet. In this manner, the flow rate of the hydraulic fluid flowing from the inlet port 1A to the outlet port 1B can be successively controlled.

An electromagnetic change-over valve is only fully opened or fully closed whereas in the flow rate-variable valve shown in FIGS. 10 and 11, the flow rate of hydraulic fluid can be continuously controlled by adjusting the intensity of electric current to be supplied to the electromagnet. Therefore, the flow rate-variable valve is capable of performing a preferable control over the flow rate of the hydraulic fluid in the hydraulic pressure control apparatus and in addition, generates a more quite sound than the electromagnetic change-over valve during operation.

In the flow rate-variable valve shown in FIG. 10, however, a sliding surface A is interposed between the inlet port 1A and the outlet port 1B. Therefore, a small amount of hydraulic fluid leaks from the inlet port 1A to the outlet port 1B via the sliding surface A.

In the flow rate-variable valve shown in FIG. 11, the variable orifice is formed by the engagement between the annular sealing member 5 and the shoulder 2E of the spool 2. Although the amount of hydraulic fluid which leaks from the inlet port 1A to the outlet port 1B in this flow rate-variable valve is smaller than that in the flow rate-variable valve shown in FIG. 10, the flow rate-variable valve is incapable of preventing the leakage of the hydraulic fluid.

An opened type flow rate-variable valve is used in addition to the closed type as shown in FIGS. 10 and 11. Even if it is excellent for the opened type flow rate-variable valve is superior to the closed type flow rate-variable valve in controlling the valve-opening/closing performance, it is necessary to keep supplying electric current thereto when the flow rate-variable valve is used as a discharge valve of an antilock braking fluid pressure control apparatus. Therefore, the opened type flow rate-variable valve is unsuitable for this kind of discharge valve. Similarly, it is necessary to keep supplying electric current to the opened type flow rate-variable valve when the flow-rate-variable valve is used as an introducing valve of a press-back type antilock braking fluid pressure control apparatus so as to introduce hydraulic fluid stored in an accumulator having a high pressure. It is also necessary to keep supplying electric current to the opened type flow rate-variable valve when the flow rate-variable valve is used as a hydraulic fluid-introducing valve in a brake traction fluid pressure control apparatus or in a leveling adjusting apparatus. Therefore, the opened type flow rate-variable valve is unsuitable for this kind of discharge valve.

The present applicant proposed a braking fluid pressure control apparatus comprising a plurality of discharge valves to accomplish a reliable operation thereof (see Japanese Patent Laid-Open Publication No. 63-61671).

In this braking fluid pressure control apparatus, a discharge valve comprising a plurality of closed type flow rate-variable valves may reduce the leakage amount of hydraulic fluid. In this case, too, the leakage of a small amount of the hydraulic fluid is unavoidable. A plurality of opened flow rate-variable valves are ineffective for preventing the leakage of the hydraulic fluid.

SUMMARY OF THE INVENTION

It is an object of the present invention to provide a hydraulic pressure control apparatus comprising a flow rate-variable valve used to prevent the leakage of hydraulic fluid and improve the performance in controlling the pressure of the hydraulic fluid.

In accomplishing these and other objects of the present invention, there is provided a hydraulic pressure control apparatus installed in an equipment comprising: a discharge duct for discharging hydraulic fluid from a control chamber; and a discharge valve for opening and closing the discharge duct. The hydraulic pressure in the control chamber is reduced and a braking force of the equipment is reduced directly or indirectly by opening the discharge valve.

In the above construction, a plurality of discharge valves is provided in series on the discharge duct; and one of the discharge valves consists of a flow rate-variable valve capable of continuously changing the flow rate of the hydraulic fluid according to the intensity of electric current; and the other discharge valves consist of electromagnetic change-over valves fully opened or fully closed.

A plurality of control chambers is provided; a plurality of discharge ducts confluent with each other is connected with each control chamber; the discharge valve comprising the flow rate-variable valve is interposed between each control chamber and the confluent point; and the discharge valve comprising the electromagnetic change-over valve is disposed downstream of the confluent point.

A hydraulic pressure control apparatus comprises: an introducing valve provided on a supply duct connecting to each other a hydraulic source and a control chamber for controlling a fluid-operated equipment or increasing or decreasing the hydraulic pressure of the fluid-operated equipment; and a discharge valve provided on a discharge duct discharging hydraulic fluid from the fluid-operated equipment or the control chamber. In the above construction, the introducing valve is opened to increase the pressure of the fluid-operated equipment or that of the control chamber; and the discharge valve is opened to decrease the pressure of the fluid-operated equipment or that of the control chamber. In the above construction, the introducing valve and/or the discharge valve are disposed in series on the supply duct or the discharge duct; at least one of a plurality of the introducing valves and/or the discharge valves consists of a flow rate-variable valve capable of changing the flow rate of the hydraulic fluid continuously according to the intensity of electric current; and the other introducing valves and/or discharge valves consist of electromagnetic change-over valves fully opened or fully closed.

A plurality of fluid-operated equipments or a plurality of control chambers is provided; the discharge duct is provided with a plurality of first discharge ducts each connecting fluid-operated equipments or control chambers to each other and a second discharge duct with which the first discharge ducts are confluent; the discharge valve consisting of the flow rate-variable valve is disposed on each of the first discharge ducts; and the discharge valve consisting of the electromagnetic change-over valve is disposed on the second discharge duct.

A plurality of fluid-operated equipments or a plurality of control chambers is provided; the supply duct is provided with a first supply duct connected with the hydraulic source and a second supply duct branching from the first supply duct and connected with the fluid-operated equipments or the control chambers; the introducing valve consisting of the electromagnetic change-over valve is disposed on the first supply duct; and the introducing valve consisting of the flow rate-variable valve is disposed on each branched second supply duct.

According to the above-described construction, an introducing valve is provided on the supply duct connecting to each other a hydraulic source and a control chamber for controlling a fluid-operated equipment or changing the hydraulic pressure of the fluid-operated equipment; and a discharge valve is provided on a discharge duct for discharging hydraulic fluid from the fluid-operated equipment or the control chamber. The introducing valve and/or the discharge valve are disposed in series on the supply duct or the discharge duct. At least one of the introducing valves and/or the discharge valves consists of a flow rate-variable valve. Therefore, the flow rate of the hydraulic fluid can be continuously controlled and small noises are generated in operation.

The other introducing valves and/or discharge valves consist of the electromagnetic change-over valve. Therefore, when the flow rate-variable valve is not operated, the leakage of hydraulic fluid can be prevented.

That is, the control of hydraulic pressure can be preferably accomplished by the use of the flow rate-variable valve with no leakage occurring, owing to the utilization of the advantage of the flow rate-variable valve and that of the electromagnetic change-over valve.

In addition, when a plurality of fluid-operated equipments or a plurality of control chambers is provided, the discharge duct is provided with a plurality of first discharge ducts each connecting fluid-operated equipments and control chambers to each other and a second discharge duct with which the first discharge ducts are confluent. The discharge valve consisting of the flow rate-variable valve is disposed on each of the first discharge ducts; and the discharge valve consisting of the electromagnetic change-over valve is disposed on the second discharge duct. Accordingly, the apparatus can perform operation favorably with the installation of only one electromagnetic change-over valve on the discharge duct. Therefore, a compact apparatus can be manufactured at a low cost.

Further, when a plurality of fluid-operated equipments or a plurality of control chambers is provided, the introducing valve consisting of the electromagnetic change-over valve is disposed on the first supply duct connected with the hydraulic source; and the introducing valve consisting of the flow rate-variable valve is disposed on each second supply duct branching from the first supply duct and connected with the fluid-operated equipments or the control chambers. Accordingly, the apparatus can perform operation favorably with the installation of only one electromagnetic change-over valve on the supply duct. Therefore, a compact apparatus can be manufactured at a low cost.

Furthermore, a plurality of discharge valves is provided in series on the discharge duct for discharging the hydraulic fluid from the control chamber. One of the discharge valves consisting of the flow rate-variable valve is capable of continuously changing the flow rate of the hydraulic fluid according to the intensity of electric current. Therefore, the flow rate of the hydraulic fluid can be continuously controlled and small noises are generated in operation.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE INVENTION

Figure 1:
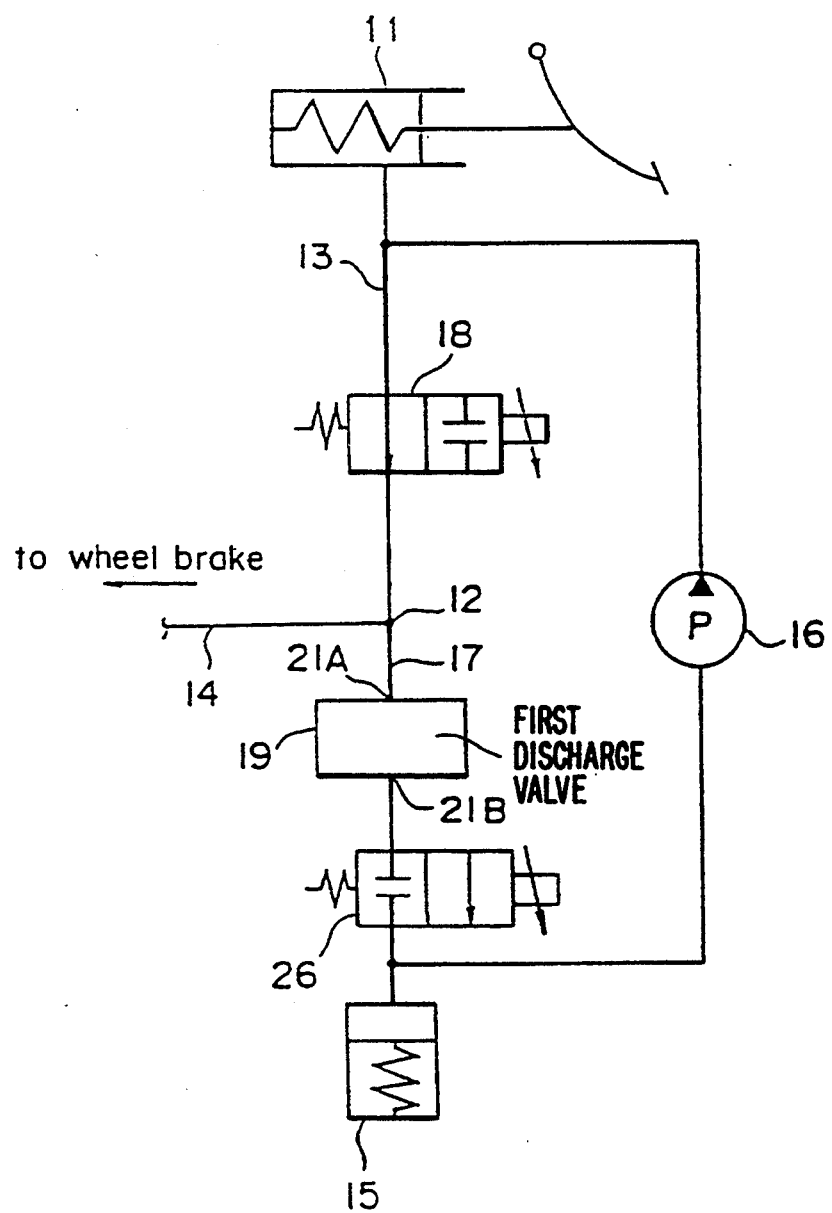
FIG. 1 is a schematic view showing a hydraulic pressure control apparatus according to a first embodiment of the present invention.

Before the description of the present invention proceeds, it is to be noted that like parts are designated by like reference numerals throughout the accompanying drawings.

A hydraulic pressure control apparatus according to a first embodiment of the present invention is described below with reference to FIGS. 1 and 2.

The hydraulic pressure control apparatus shown in FIG. 1 is an antilock brake hydraulic pressure control apparatus which directly adjusts the pressure of a fluid-operated wheel brake (not shown).

The hydraulic pressure control apparatus comprises a supply duct 13 connecting a master cylinder 11 constituting a hydraulic source and a branch point 12 to each other. The branch point 12 is connected with a duct 14 communicating with the wheel brake (not shown). The branch point 12 is also connected with a discharge duct 17 for circulating hydraulic fluid to the master cylinder 11 via a reservoir 15 and a pump 16.

There is provided on the supply duct 13 a fluid-introducing valve 18 comprising an opened type electromagnetic change-over valve which is fully opened or fully closed.

There is provided between the branch point 12 and the reservoir 15 a first discharge valve 19 comprising a closed type flow rate-variable valve capable of continuously changing the flow rate of the hydraulic fluid according to the intensity of electric current.

The construction of the first discharge valve 19 is described below with reference to FIG. 2. A sleeve 21 of the first discharge valve 19 accommodates a spool 22 which is slidable in the sleeve 21. A duct 22B including an orifice 22A is formed in the spool 22 to be urged by an electromagnet 23 in the direction shown by an arrow F of FIG. 2. In the duct 22B, one side of the orifice 22A communicates with an inlet port 21A and the other side thereof communicates with an outlet port 21B. A groove 22D formed on the peripheral surface of the spool 22 is inserted into an annular sealing member 25.

In the flow rate-variable valve, a shoulder 22E of the spool 22 is brought into close contact with the sealing member 25 or move away therefrom, thus communicating the inlet port 21A and duct 22B with each other or cutting off the communication therebetween to form a variable orifice keeping the pressure difference in the duct 22B between both sides of the orifice 22A. The intensity of electric current is adjustably supplied to the electromagnet 23 to regulate the urging force applied by the electromagnet 23 to the spool 22. In this manner, the flow rate of the hydraulic fluid flowing from the inlet port 21A to the outlet port 21B can be continuously controlled.

There is provided, between the first discharge valve 19 disposed on the discharge duct 17 and the reservoir 15, a second discharge valve 26 comprising a closed type electromagnetic change-over valve which is fully opened or fully closed.

The fluid-introducing valve 18, the first discharge valve 19, and the second discharge valve 26 are driven by a controller (not shown) for detecting whether or not the wheel has been locked based on a signal transmitted thereto from a wheel speed sensor.

The operation of the hydraulic pressure control apparatus according to the first embodiment is described below.

When anti-lock control is not performed, the fluid-introducing valve 18 is opened while the first discharge valve 19 and the second discharge valve 26 are closed.

The discharge duct 17 connects the first discharge valve 19 comprising the flow rate-variable valve and the second discharge valve 26 comprising the electromagnetic change-over valve to each other. Therefore, even though a slight amount of hydraulic fluid leaks from the first discharge valve 19 due to the hydraulic pressure applied by a master cylinder 11, the hydraulic fluid which has leaked is stopped by the second discharge valve 26 and is thus prevented from flowing downstream. Accordingly, when the hydraulic fluid has leaked from the first discharge valve 19, the hydraulic pressure between the first discharge valve 19 and the second discharge valve 26 becomes equal to that of the master cylinder 11 and thus the hydraulic fluid is prevented from leaking from the first discharge valve 19. Therefore, so long as the first discharge valve 19 and the second discharge valve 26 operate normally, the leakage of the hydraulic fluid from the first discharge valve 19 can be ignored.

When the controller has detected the locking of the wheel, the second discharge valve 26 is opened to prepare the start of an antilock control. When the wheel-locked state continues, the fluid-introducing valve 18 is closed and the first discharge valve 19 is opened to feed the hydraulic fluid of the wheel brake to the reservoir 15 via the duct 14 and the discharge duct 17. At this time, the pump 16 operates to circulate the hydraulic fluid in the reservoir 15 to the master cylinder 11.

In the first embodiment, since the first discharge valve 19 comprises the flow rate-variable valve, it is possible to continuously control the flow rate of the hydraulic fluid under a pressure-reduced state while the antilock control is performed. In addition, the flow rate-variable valve makes a smaller noise than the electromagnetic change-over valve.

When the hydraulic pressure of the wheel brake is reduced owing to the pressure reduction caused by the antilock control and thus the release operation of the wheel-locked state has started, the first discharge valve 19 is closed and the fluid-introducing valve 18 is opened. There is a possibility that the hydraulic fluid leaks from the first discharge valve 19 at this time. But the antilock control is performed for several tens of seconds and the hydraulic fluid which has leaked from the first discharge valve 19 is circulated to the master cylinder 11 by the pump 16 at a high speed. Therefore, the leakage of the hydraulic fluid can be ignored.

When the release operation of the locked state of the wheel is completed, the pump 16 is stopped and the second discharge valve 26 is closed to return to the state in which the antilock control is not performed.

In the first embodiment, the first discharge valve 19 disposed upstream of the branch point 12 comprises the flow rate-variable valve and the second discharge valve 26 disposed downstream of the reservoir 15 comprises the electromagnetic change-over valve. But it is possible to compose the first discharge valve 19 of an electromagnetic change-over valve and the second discharge valve 26 of a flow rate-variable valve.

When the antilock control is not performed, the first discharge valve 19 comprising the flow rate-variable valve is closed to cut off the communication between the wheel brake and the reservoir 15. Accordingly, the hydraulic pressure applied by the master cylinder 11 does not act on the second discharge valve 26 comprising the electromagnetic change-over valve and hence no leakage of the hydraulic fluid occurs.

Figure 3:
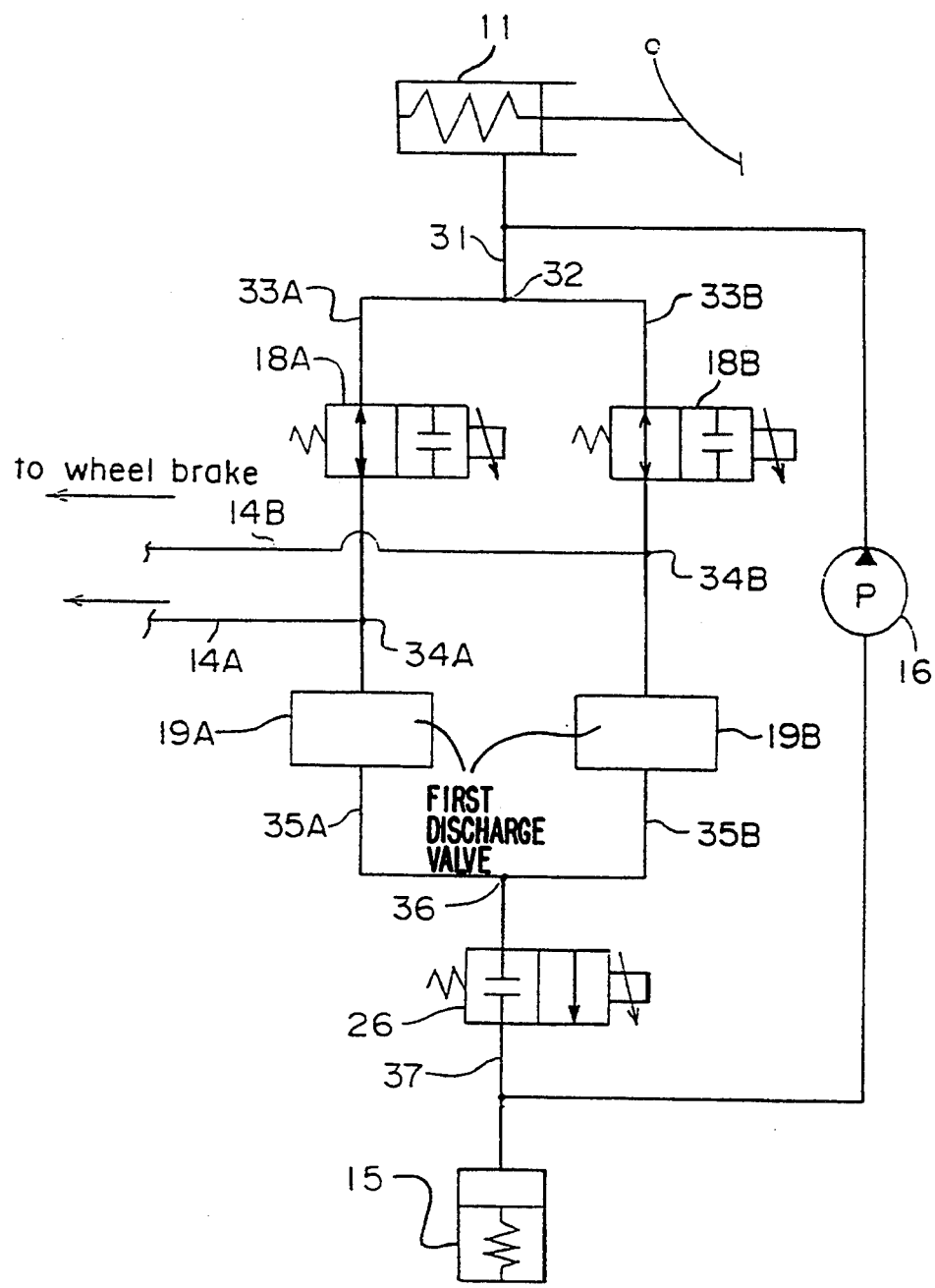
FIG. 3 is a schematic view showing a hydraulic pressure control apparatus according to a second embodiment of the present invention.

A hydraulic pressure control apparatus according to a second embodiment is described below with reference to FIG. 3. In the second embodiment, a two-line wheel brake is connected to the master cylinder 11 by means of one duct.

A first supply duct 31 connected with the master cylinder 11 branches off to two lines, namely, second supply ducts 33A and 33B at a branch point 32. The second supply ducts 33A and 33B are connected with each of branch points 34A and 34B. Each of the branch points 34A and 34B is connected with each of ducts 14A and 14B connected with the wheel brake, respectively and each of first discharge ducts 35A and 35B. The first discharge ducts 35A and 35B are confluent at a confluent point 36 connected with a second discharge duct 37. The second discharge duct 37 is connected with the master cylinder 11 via the reservoir 15 and pump 16.

There are provided on the second supply ducts 33A and 33B fluid-introducing valves 18A and 18B, respectively comprising an opened type electromagnet change-over valve which is fully opened or fully closed.

First discharge valves 19A and 18B each comprising a closed type flow rate-variable valve are provided on each of the first discharge ducts 35A and 35B. There is provided on the second discharge duct 37 a second discharge valve 26 comprising a closed type electromagnet change-over valve which is fully opened or fully closed.

In the second embodiment, the first discharge valves 19A and 19B comprise the flow rate-variable valve. Therefore, similarly to the first embodiment, the hydraulic pressure control apparatus continuously adjusts the flow rate of the hydraulic fluid in the antilock control to be performed under a pressure-reduced state, thus accomplishing an accurate control and generating small noises.

In the second embodiment, the second discharge valve 26 comprising the electromagnet change-over valve is disposed downstream of the first discharge valves 19A and 18B each comprising the flow rate-variable valve. Therefore, the leakage of the hydraulic fluid from the flow rate-variable valves can be prevented when the antilock control is not performed.

In the second embodiment, each of the first discharge ducts 35A and 35B confluent at the confluent point 36 is connected with each of the branch points 34A and 34B communicating with the wheel brake as described above, and the first discharge valves 19A and 19B each comprising the flow rate-variable valve are provided on each of the first discharge ducts 35A and 35B. Therefore, only one second discharge valve 26 comprising the electromagnetic valve is formed on the second discharge duct 37 downstream of the confluent point 36 so that a compact apparatus can be manufactured at a low cost.

Figure 4:
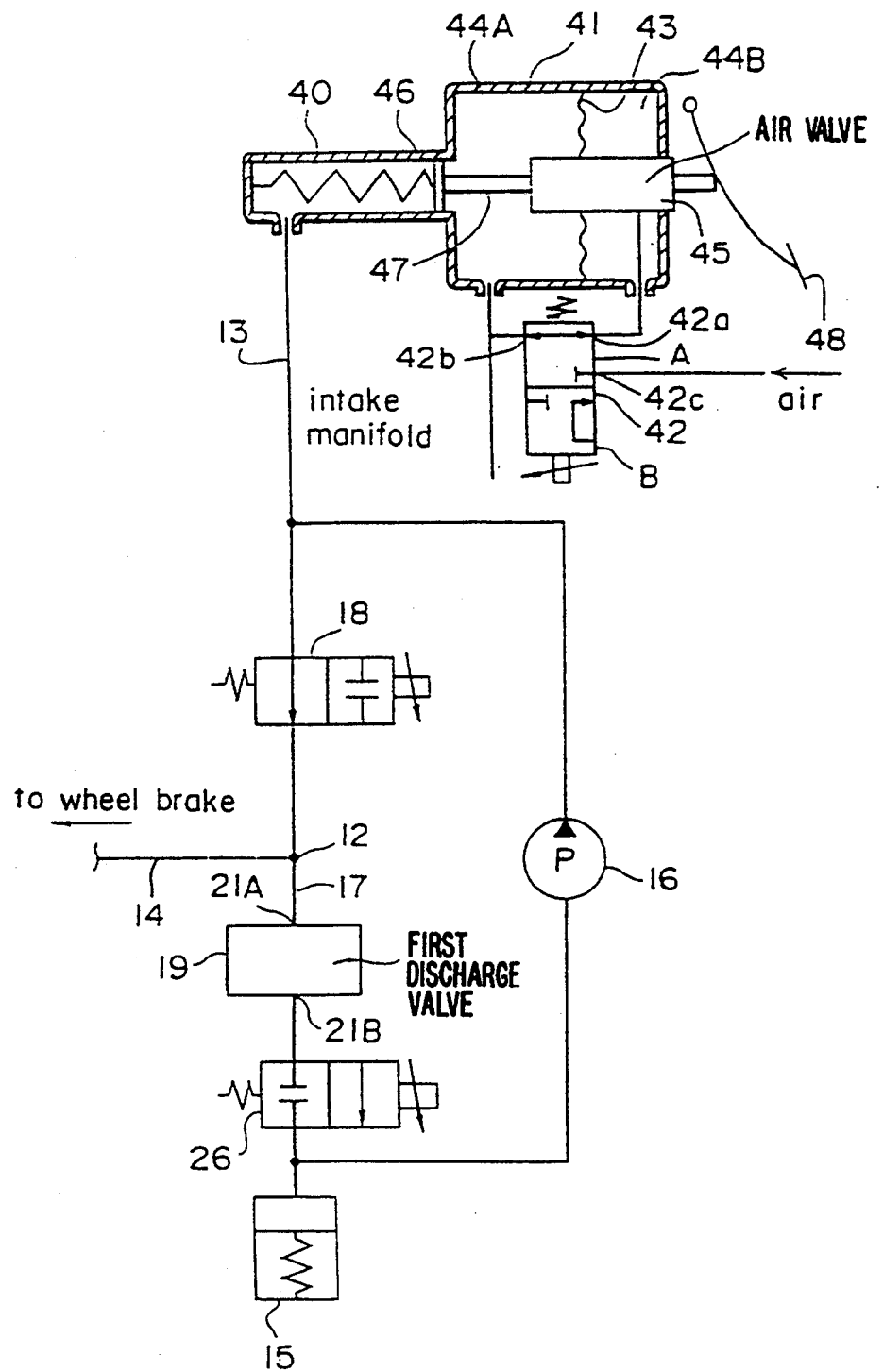
FIG. 4 is a schematic view showing a hydraulic pressure control apparatus according to a third embodiment of the present invention.

A hydraulic pressure control apparatus according to a third embodiment of the present invention is described below with reference to FIG. 4.

The hydraulic pressure control apparatus according to the third embodiment is used as a traction control brake hydraulic pressure control apparatus. The apparatus adjusts the hydraulic pressure of the wheel brake directly.

In the hydraulic pressure control apparatus according to the third embodiment, the master cylinder 40 is provided with a vacuum booster 41 and an atmospheric pressure-introducing valve 42.

The vacuum booster 41, having a known construction, has a first chamber 44A and a second chamber 44B with a partitioning wall 43 interposed therebetween. The partitioning wall 43 is movable in the right and left in FIG. 4, with the first chamber 44A and the second chamber 44B airtight. Art air valve 45 is installed integrally with the partitioning wall 43. The air valve 45 is connected with a shaft 47 mounted on a piston 46 of the master cylinder 40.

The air valve 45 connects the second chamber 44B to a first port 42a of the atmospheric pressure-introducing valve 42 or to the atmospheric air according to the relationship between the movement amount of the air valve 45 and the pressed amount of the brake pedal. That is, when the brake pedal is not pressed, the air valve 45 connects the second chamber 44B to the first port 42a while when the brake pedal is pressed, the air valve 45 connects the second chamber 44B to the atmospheric air.

The first chamber 44A is always connected with an intake manifold (not shown) of the engine, and the pressure of the first chamber 44A is always equal to that of the intake manifold.

The atmospheric pressure-introducing valve 42 comprises an electromagnetic change-over valve of three-port two-position type, i.e., it comprises the first port 42a communicating with the air valve 45, a second port 42b connected with the intake manifold of the engine, and a third port 42c communicating with the atmospheric air. The atmospheric pressure-introducing valve 42 is at a (A) position in which when electric current is not supplied, the first port 42a and the second port 42b are connected to each other and the third port 42c is cut off. The atmospheric pressure-introducing valve 42 is at a (B) position in which when electric current is supplied, the first port 42a and the third port 42c are connected to each other and the second port 42b is cut off.

In the third embodiment, a supply duct 13 connecting the master cylinder 40 and the branch point branch point 12 to each other is provided. The branch point branch point 12 is also connected with a duct 14 communicating with the wheel brake and a discharge duct discharge duct 17 which flows hydraulic fluid to the master cylinder 40 via the reservoir 15 and the pump 16.

The fluid-introducing valve 18 comprising an opened type electromagnetic change-over valve is disposed on the supply duct 13. The first discharge valve 19 comprising the closed type flow rate-variable valve and the second discharge vale 26 comprising the closed type electromagnetic change-over valve are provided between the branch point 12 of the discharge duct 17 and the reservoir 15.

The operation of the hydraulic pressure control apparatus according to the third embodiment is described below.

When the traction control is not performed, the fluid-introducing valve 18 is opened while the first discharge valve 19 and the second discharge valve 26 are closed. Consequently, the hydraulic fluid is supplied to the wheel brake via the supply duct 13 and the duct 14 depending on the pressed amount of the brake pedal 48.

When it is detected that the wheel has started to spin, the atmospheric pressure-introducing valve 42 becomes located at the (B) position. As a result, the atmospheric pressure is introduced into the second chamber 44B of the vacuum booster 41, and the air valve 45 moves together with partitioning wall 43 toward the left in FIG. 4 due to the difference between the pressure in the second chamber 44B and that in the first chamber 44A communicating with the intake manifold of the engine. Accordingly, even though a driver does not press the brake pedal 48, the piston 46 of the master cylinder 40 moves toward the left in FIG. 4, thus generating a hydraulic pressure. In the traction control, the hydraulic pressure is supplied from the master cylinder 40 to the wheel brake via the supply duct 13 and the duct 14.

In the third embodiment, the discharge duct 17 connects the first discharge valve 19 comprising the flow rate-variable valve and the second discharge valve 26 comprising the electromagnetic change-over valve to each other. Therefore, even though the hydraulic fluid leaks in a slight amount from the first discharge valve 19, the hydraulic fluid which has leaked therefrom is prevented from flowing downstream of the second discharge valve 26. That is, if the hydraulic fluid supplied from the master cylinder 40 to the first discharge valve 19 leaks therefrom under the traction control or not under the traction control, the pressure of the hydraulic fluid between the first discharge valve 19 and the second discharge valve 26 becomes equal to that of the master cylinder 40 immediately and thus the hydraulic fluid does not leak from the first discharge valve 19 any more.

When it is detected that the slipped state of the wheel has started to release due to the pressure-increased state in the traction control, the fluid-introducing valve 18 is closed while the first discharge valve 19 and the second discharge valve 26 are opened. As a result, the hydraulic fluid supplied from the wheel brake is supplied to the reservoir 15, and drive the pump 16 is driven to circulate the hydraulic fluid stored in the reservoir 15 to the master cylinder 40.

The first discharge valve 19 comprises the flow rate-variable valve. Therefore, the flow rate of the hydraulic fluid can be continuously controlled in the pressure-reduced state. As described previously in the first embodiment, the first discharge valve 19 (flow rate-variable valve) makes a smaller noise than the electromagnetic change-over valve.

When the hydraulic pressure of the wheel brake is reduced due to the pressure reduction, the first discharge valve 19 and the second discharge valve 26 are opened, the fluid-introducing valve 18 is opened, and the atmospheric pressure-introducing valve 42 becomes located at the (A) position. As a result, the state in which the traction control is not performed is restored.

In the third embodiment, the first discharge valve 19 disposed upstream of the branch point 12 comprises the flow rate-variable valve and the second discharge valve 26 disposed downstream of the reservoir 15 comprises the electromagnetic change-over valve. But it is possible to compose the first discharge valve 19 of an electromagnetic change-over valve and the second discharge valve 26 of a flow rate-variable valve.

When the traction control is performed or not performed, the hydraulic fluid supplied by the master cylinder 40 does not act on the second discharge valve 26 and thus there is no possibility that the hydraulic fluid leaks therefrom. This is because the first discharge valve 19 is interposed between the branch point 12 connected with the wheel brake and the second discharge valve 26.

Figure 5:
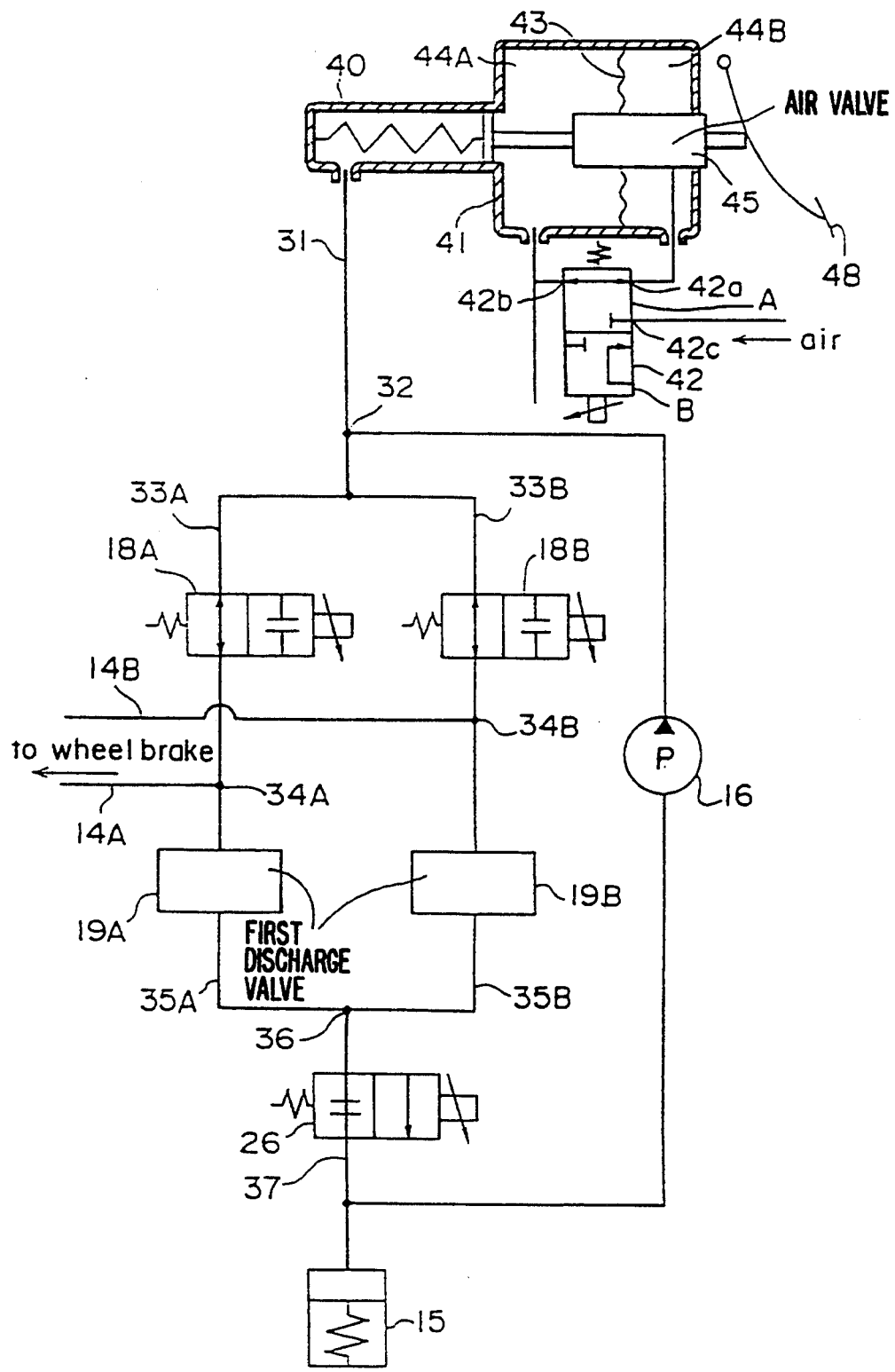
FIG. 5 is a schematic view showing a hydraulic pressure control apparatus according to a fourth embodiment of the present invention.

A hydraulic pressure control apparatus according to the fourth embodiment of the-present invention is described below with reference to FIG. 5. In the fourth embodiment, a two-line wheel brake is connected to the master cylinder 40 by means of one duct.

A first supply duct 31 connected with the master cylinder 11 branches off to two lines, namely, second supply ducts 33A and 33B at a branch point 32. The second supply ducts 33A and 33B are connected with each of branch points 34A and 34B. Each of the branch points 34A and 34B is connected with each of ducts 14A and 14B each connected with a wheel brake and each of first discharge ducts 35A and 35B. The first discharge ducts 35A and 35B are confluent at a confluent point 36 connected with a second discharge duct 37. The second discharge duct 37 is connected with the master cylinder 11 via the reservoir 15 and pump 16.

The fluid-introducing valves 18A and 18B each comprising an opened electromagnetic change-over valve are disposed on each of the second supply ducts 33A and 33B.

First discharge valves 19A and 19B each comprising a flow rate-variable valve are provided on each of the first discharge ducts 35A and 35B. There is provided on the second discharge duct 37 a second discharge valve 26 comprising a closed type electromagnet change-over valve.

In the fourth embodiment, the first discharge valves 19A and 19B comprise the flow rate-variable valve.

Therefore, similarly to the third embodiment, the hydraulic pressure control apparatus continuously adjusts the flow rate of the hydraulic fluid in the traction control to be performed under a pressure-reduced state, thus accomplishing an accurate control and generating small noises.

In the fourth embodiment, the second discharge valve 26 comprising the electromagnet change-over valve is disposed downstream of the first discharge valves 19A and 19B each comprising the flow rate-variable valve. Therefore, the leakage of the hydraulic fluid from the first discharge valves 19A and 19B can be prevented.

In the fourth embodiment, each of the first discharge ducts 35A and 35B confluent at the confluent point 36 is connected with each of the branch points 34A and 34B communicating with the wheel brake as described above, and the first discharge valves 19A and 19B each comprising the flow rate-variable valve are provided on each of the first discharge ducts 35A and 35B. Therefore, only one second discharge valve 26 comprising the electromagnetic valve is formed on the second discharge duct 37 downstream of the confluent point 36 so that a compact apparatus can be manufactured at a low cost.

Figure 6:
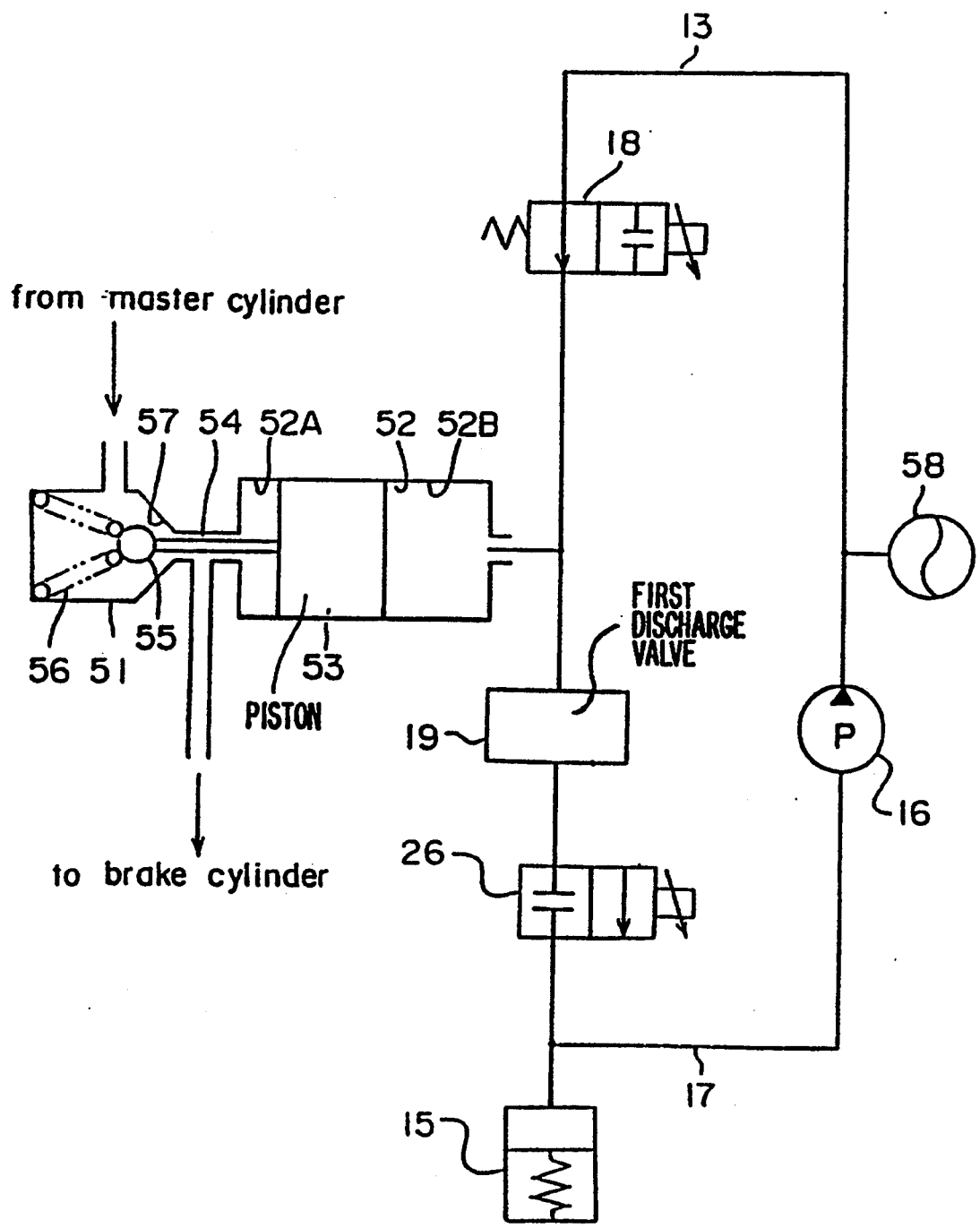
FIG. 6 is a schematic view showing a hydraulic pressure control apparatus according to a fifth embodiment of the present invention.

A hydraulic pressure control apparatus according to the fifth embodiment of the present invention is described below with reference to FIG. 6. The hydraulic pressure control apparatus is used as an antilock brake hydraulic pressure control apparatus which adjusts the braking force of a wheel brake indirectly.

In the fifth embodiment, there are provided a cutoff valve 51 for communicating a master cylinder (not shown) and a wheel brake (not shown) to each other and cutting off the communication therebetween; and a control chamber 52 communicating with the cutoff valve 51.

The control chamber 52 accommodates the piston 53 slidably installed. The piston 53 partitions the control chamber 52 into a first portion 52A and a second portion 52B. The hydraulic fluid is prevented from flowing from the first portion 52A to the second portion 52B or vice versa.

In the cutoff valve 51, a spring 56 elastically urges a spherical valve 55 installed on the leading end of a shaft 54 projecting from the piston 53 to a valve seat 57. One side of the valve seat 57 is connected with the master cylinder and the other side thereof is connected with the wheel brake. Therefore, the cutoff valve 51 communicates the master cylinder with the wheel brake or cuts off the communication therebetween owing to the movement of the piston 53 caused by the balance between the urging force toward the right in FIG. 6 generated by the spring 56 and the hydraulic pressure in the first portion 52A of the control chamber 52 and the urging force toward the left in FIG. 6 generated by the hydraulic pressure in the second portion 52B of the control chamber 52.

The second portion 52B of the control chamber 52 is connected with the supply duct 13 connected with an accumulator 58 storing a high pressure hydraulic fluid discharged from the pump 16 and constituting the hydraulic source; and a discharge duct 17 for circulating the hydraulic fluid discharged from the second portion 52B to the accumulator 58.

A fluid-introducing valve 18 comprising a closed type electromagnetic change-over valve which is fully opened or fully closed is disposed on the supply duct 13.

There is provided, on the control chamber 52 side of the discharge duct 17, the first discharge valve 19 comprising a closed type flow rate-variable valve. The second discharge valve 26 comprising a closed type electromagnetic change-over valve is disposed downstream of the first discharge valve 19. The discharge duct 17 circulates the hydraulic fluid to the accumulator 58 via the reservoir 15 and the pump 16.

The operation of the hydraulic pressure control apparatus according to the fifth embodiment is described below.

When an antilock control is not performed, the fluid-introducing valve 18 is opened while the first discharge valve 19 and the second discharge valve 26 are closed, and the pressure in the control chamber 52 is equal to that of the accumulator 58. Therefore, the piston 53 is in the left of the control chamber 52 and the reservoir 15 is opened even though a driver brakes the car.

When the antilock control is not performed, the hydraulic pressure of the accumulator 58 acts on the first discharge valve 19 comprising the flow rate-variable valve. Even though a slight amount of hydraulic fluid leaks from the first discharge valve 19, the hydraulic fluid which has leaked therefrom is prevented from flowing downstream of the second discharge valve 26, and the hydraulic pressure between the first discharge valve 19 and the second discharge valve 26 becomes equal to that of the accumulator 58 immediately. Therefore, the hydraulic fluid does not leak from the first discharge valve 19 any more.

When the start of the locked state of the wheel is detected, the fluid-introducing valve 18 is closed. When the locked state continues, the first discharge valve 19 and the second discharge valve 26 are opened, thus reducing the pressure in the second portion 52B of the control chamber 52. Due to the pressure reduction of the second portion 52B, the piston 53 moves toward the right in FIG. 6, thus closing the cutoff valve 15. With a further reduction of the pressure in the second portion 52B of the control chamber 52, the volume of the first portion 52A increases due to the movement of the piston 53 to the right. As a result, the hydraulic pressure of the wheel brake is reduced to a pressure almost equal to that of the second portion 52B.

In the fifth embodiment, the first discharge valve 19 comprises the flow rate-variable valve. Therefore, the hydraulic pressure control apparatus is capable of continuously adjusting the flow rate of the hydraulic fluid to be discharged from the second portion 52B of the control chamber 52 to the reservoir 15 in the antilock control to be performed under a pressure-reduced state. In addition, the first discharge valve 19 (flow rate-variable valve) makes a small noise than the electromagnetic change-over valve.

When it is detected that the locked state of the wheel has been released due to the pressure reduction in the antilock control, the first and second discharge valves 19, 26 are closed and the fluid-introducing valve 18 is opened, and the hydraulic pressure of the accumulator 58 acts on the second portion 52B. As a result, the state in which the antilock control is not performed is restored.

In the fifth embodiment, the first discharge valve 19 disposed on the discharge duct 17 and upstream of the control chamber 52 comprises the flow rate-variable valve and the second discharge valve 26 disposed downstream of the reservoir 15 comprises the electromagnetic change-over valve. But it is possible to compose the first discharge valve 19 of an electromagnetic change-over valve and the second discharge valve 26 of a flow rate-variable valve.

A hydraulic pressure control apparatus according to the sixth embodiment is described below with reference to FIG. 7.

The hydraulic pressure control apparatus is used as an antilock brake hydraulic pressure control apparatus which adjusts the braking force of a wheel brake indirectly.

In the sixth embodiment, there are provided a cutoff valve 61 for communicating a master cylinder (not shown) and a wheel brake (not shown) to each other and cutting off the communication therebetween; and a control chamber 62 communicating with the cutoff valve 61.

The control chamber 62 comprises a large-diameter portion 62a having a comparatively large sectional area and a small-diameter portion 62b, having a comparatively small sectional area, continuous with the large-diameter portion 62a.

The piston 63 is slidably installed in the control chamber 62.

The piston 63 comprises a first portion 63a engaging the large-diameter portion 62a and a second portion 63b engaging the small-diameter portion 62b. A shaft 63c projects from the leading end of the second portion 63b.

The large-diameter portion 62a of the control chamber 62 is partitioned into a first portion 64A and a second portion 64B by the first portion 63a of the piston 63. The small-diameter portion 62b of the control chamber 62 is partitioned by the second portion 63b of the piston 63 so as to form a third portion 64C of the control chamber 62.

Figure 7:
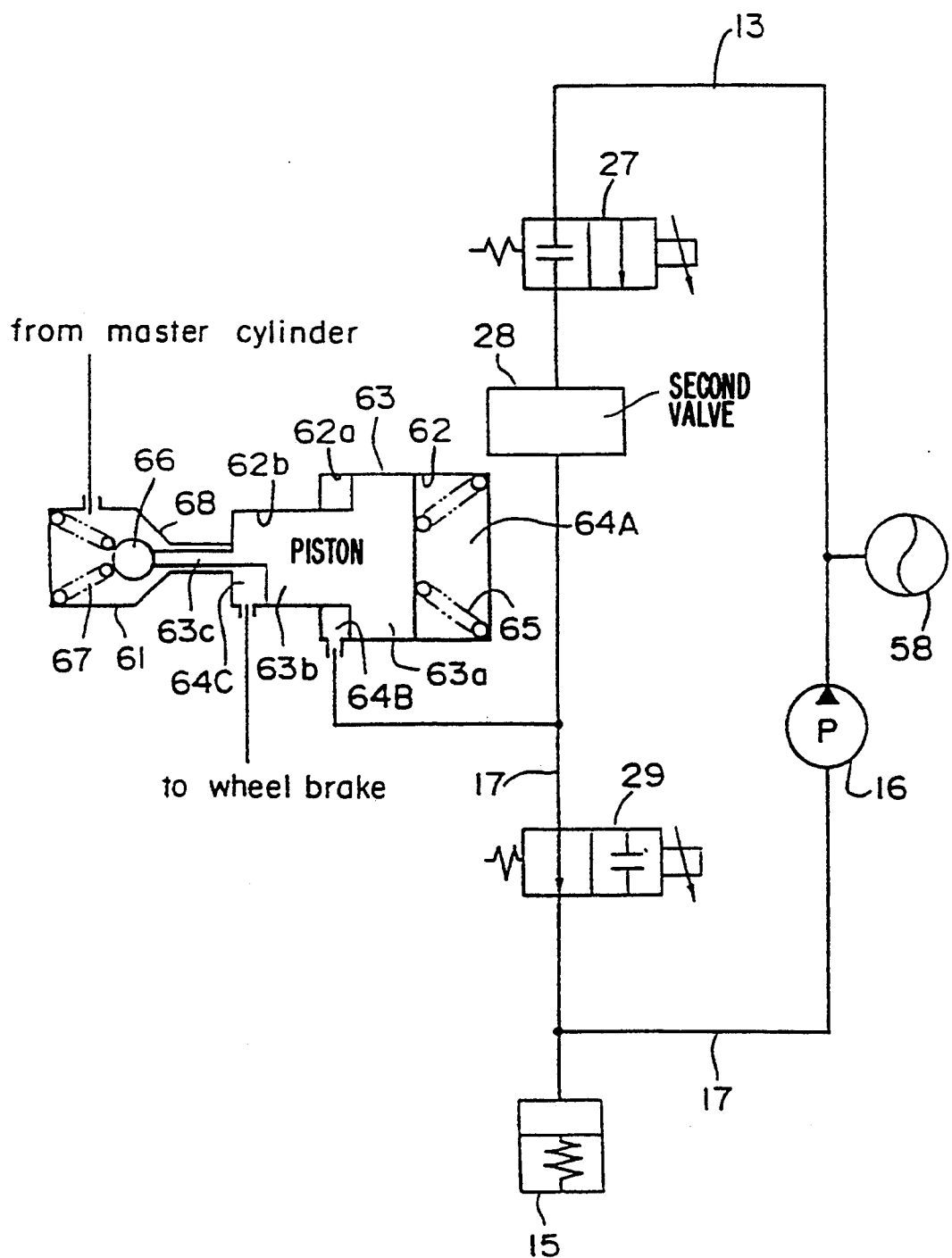
FIG. 7 is a schematic view showing a hydraulic pressure control apparatus according to a sixth embodiment of the present invention.

A first spring 65 mounted on the first portion 64A of the control chamber 62 urges the piston 63 toward the left in FIG. 7.

In the cutoff valve 61, a spring 56 elastically urges a spherical valve 66 installed on the leading end of a shaft 63c projecting from the piston 63 to a valve seat 68. The left side of the valve seat 68 is connected with the master cylinder. The third portion 64C of the control chamber 62 disposed in the right of the valve seat 68 in FIG. 7 is connected with the wheel brake. The valve 66 communicates the master cylinder with the wheel brake or cuts off the communication therebetween owing to the movement of the piston 53 caused by the balance between the force, toward the right in FIG. 7, in combination of the second spring 56, the hydraulic pressure in the second portion 64B, and the force of the third portion 64C and the force, toward the left in FIG. 7, in combination of the urging force of the first spring 65 and the hydraulic pressure in the first portion 64A of the control chamber 52.

The second portion 64B of the control chamber 62 is connected with the supply duct 13 connected with the accumulator 58 and the discharge duct 17 for circulating the hydraulic fluid to the accumulator 58.

A first fluid-introducing valve 27 comprising a closed type electromagnetic change-over valve and a second fluid-introducing valve 28 comprising a flow rate-variable valve are continuously disposed on the supply duct 13. A discharge valve 29 comprising an opened type electromagnetic change-over valve is disposed on the discharge duct 17.

The operation of the hydraulic pressure control apparatus according to the sixth embodiment is described below.

When the antilock control is not performed, the first fluid-introducing valve 27 and the second fluid-introducing valve 28 are closed and the piston 63 is at the unoperating position, namely, in the left in FIG. 7 due to the urging force of the first spring 65. In this state, the cutoff valve 61 is opened and thus the master cylinder and the wheel cylinder communicate with each other.

In the sixth embodiment, the first fluid-introducing valve 27 comprising the closed type electromagnetic change-over valve is interposed between the accumulator 58 storing a high-pressure hydraulic fluid and the second fluid-introducing valve 28 comprising the flow rate-variable valve. Accordingly, while the antilock control is not performed, the hydraulic fluid does not leak from the second fluid-introducing valve 28.

Upon detection of the start of the locked state of the wheel, the discharge valve 29 is closed to prepare the start of the antilock control. With the locked state continuing, the first and second fluid-introducing valve 27 and 28 are opened. As a result, the hydraulic fluid of the accumulator 58 of a high pressure is supplied to the second portion 64B of the control chamber 62 and thus the hydraulic pressure of the second portion 64B is increased. Then, the piston 63 moves to the right in FIG. 7, thus closing the cutoff valve 61. With a further rise of the hydraulic pressure of the second portion 64B, the piston 63 moves to the right. Consequently, the volume of the third portion 64C expands, thus decreasing the pressure of the wheel brake. The second valve 19 comprises the flow rate-variable valve. Therefore, the flow rate of the hydraulic fluid can be continuously controlled in the pressure-reduced state. As described previously in the first embodiment, the second fluid-introducing valve 28 comprises the flow rate-variable valve. Accordingly, the flow rate of the hydraulic fluid to be supplied from the accumulator 58 to the second portion 64B can be continuously controlled and the second fluid-introducing valve 28 makes a small noise in this control.

When it is detected that the release of the locked state of the wheel has started, the first fluid-introducing valve 27 and the second fluid-introducing valve 28 are closed and the discharge valve 29 is opened to supply the hydraulic fluid of the second portion 64B to the reservoir 15. As a result, the pressure of the second portion 64B is reduced. Consequently, the piston 63 is moved to the left in FIG. 7 by the urging force of the first spring 65. In this manner, the state in which antilock control is not performed is restored.

In the sixth embodiment, the first fluid-introducing valve 27 disposed on the accumulator side (upstream side) comprises the electromagnetic change-over valve and the second fluid-introducing valve 28 disposed on the control chamber side (downstream side) comprises the flow rate-variable valve, but it is possible to compose the first fluid-introducing valve 27 of a flow rate-variable valve and the second fluid-introducing valve 28 of an electromagnetic change-over valve.

A hydraulic pressure control apparatus according to the seventh embodiment is described below with reference to FIG. 8.

The hydraulic pressure control apparatus according to the seventh embodiment is used as a traction control brake hydraulic pressure control apparatus. The apparatus adjusts the braking force of the wheel brake indirectly.

In the seventh embodiment, a control chamber 71 is interposed between the master cylinder (not shown)

and the wheel brake (not shown). There is provided in the control chamber 71 a cutoff valve 72 for communicating the master cylinder with the wheel brake or cutting off the communication therebetween.

The control chamber 71 accommodates a piston 73 slidably installed. The piston 73 partitions the control chamber 71 into a first portion 71A disposed in the right of FIG. 8 and a second portion 71B disposed in the left of FIG. 8. The hydraulic fluid is prevented from flowing from the first portion 71A to the second portion 71B or vice versa.

A first port 74A connected with the master cylinder is provided on an end surface of the second portion 71B. A second port 74B connected with the wheel brake is formed on the peripheral surface of the second portion 71B.

Figure 8:
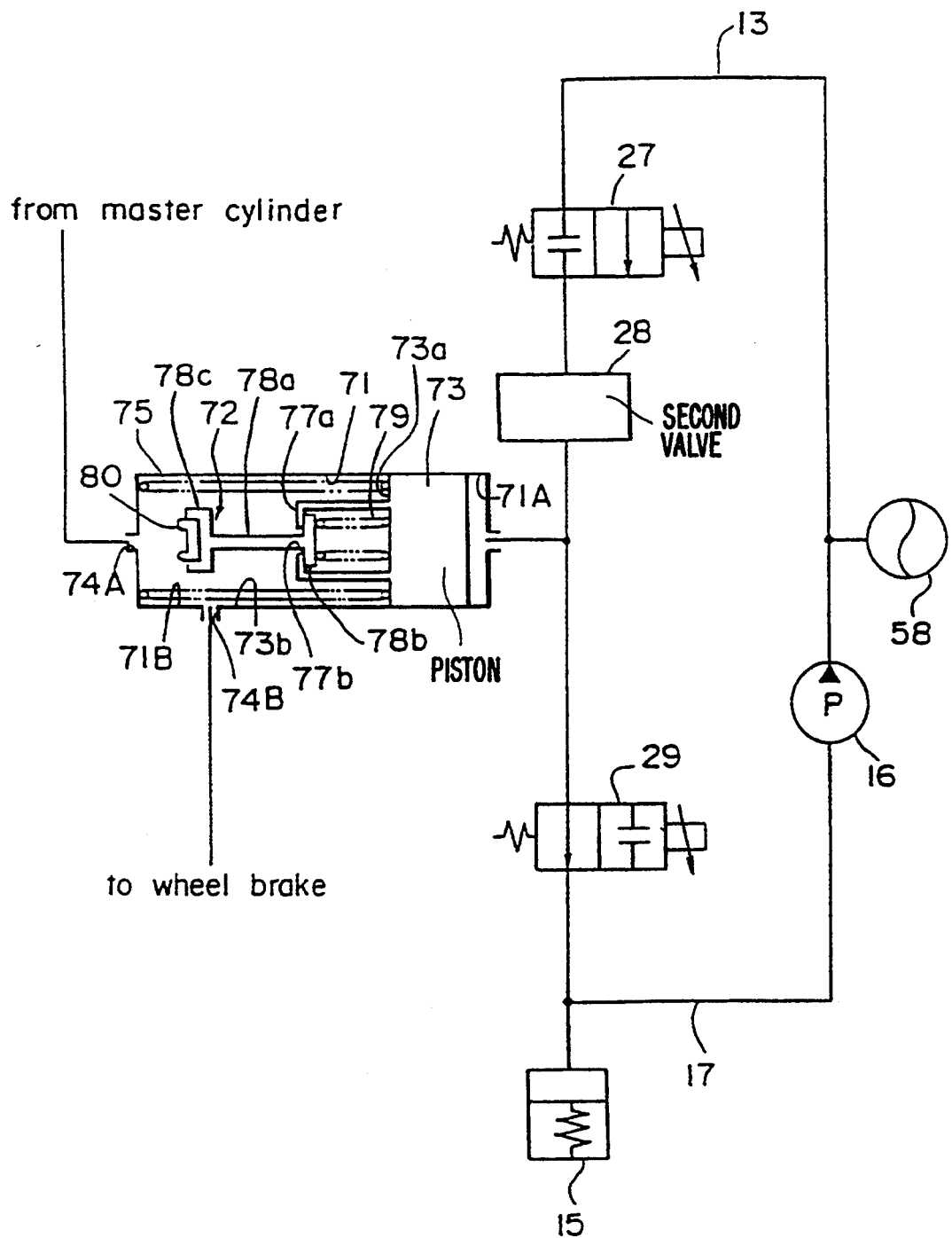
FIG. 8 is a schematic view showing a hydraulic pressure control apparatus according to a seventh embodiment of the present invention.
Figure 10:
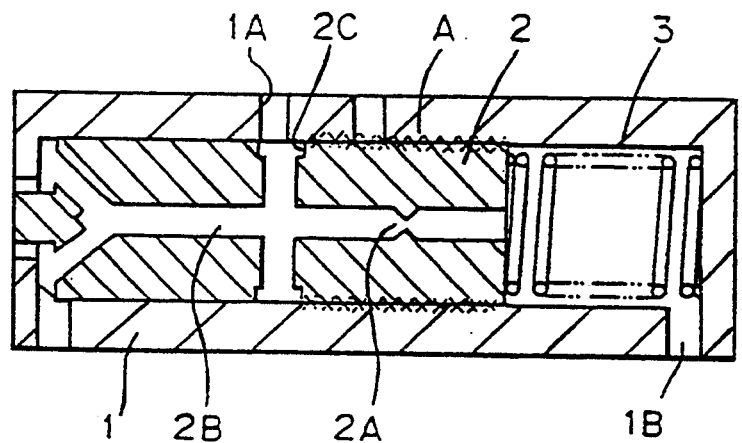
FIG. 10 is a partial sectional view showing a conventional flow rate-variable valve.
Figure 11:
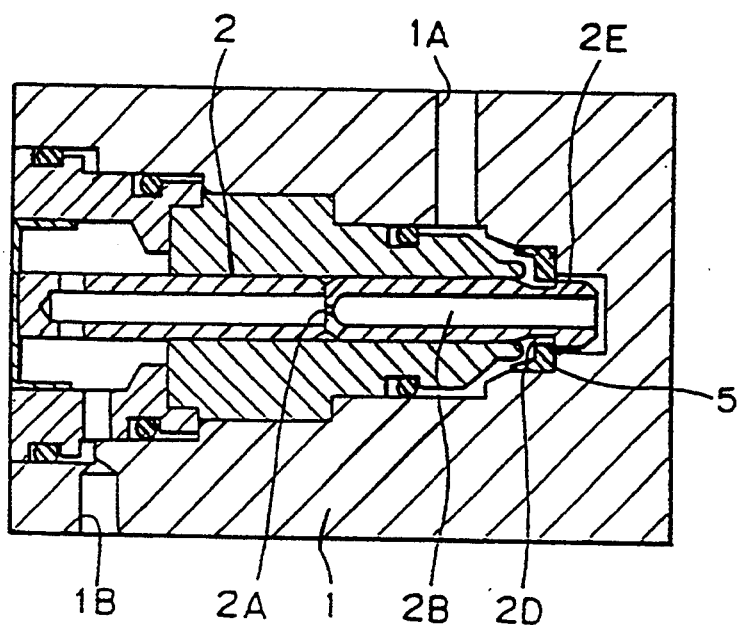
FIG. 11 is a partial sectional view showing another conventional flow rate-variable valve.

The piston 73 is elastically urged to the right in FIG. 8 by a first spring 75 mounted on the second portion 71B of the control chamber 71. A hollow cage 77 is formed integrally with an end surface 73a, of the piston 73, disposed in the left of FIG. 8. An opening 77b is formed in the center of an end portion 77a of the cage 77.

The cage 77 accommodates a large-diameter spring-receiving portion 78b formed on one end of a bar-shaped portion 78a of a valve 78. A second spring 79 is mounted between the spring-receiving portion 78b and the end surface 73a of the piston 73. The bar-shaped portion 78b of the valve 78 projects from the opening 77b of the cage 77. The dimension of the spring-receiving portion 78b is set to be larger than that of the opening 77b, and the spring-receiving portion 78b is locked on the end portion 77a of the cage 77 due to the urging force of the second spring 79.

The large-diameter sealing member-holding portion 78c is formed on the other end of the bar-shaped portion 78a of the valve 78. A sealing member 80 made of an elastic material is installed on the sealing member-holding portion 78c.

The sealing member 80 of the valve 78 opens or closes the first port 73a owing to the movement of the piston 73 caused by the balance between the force, toward the right in FIG. 8, in combination of the urging force of the first spring 75 and the hydraulic pressure in the second portion 71B of the control chamber 71 and the force, toward the left in FIG. 8, of the hydraulic pressure of the first spring 71A of the control chamber 71. In this manner, sealing member 80 of the valve 78 constitutes the cutoff valve 72 for communicating the master cylinder with the wheel brake or cutting off the communication therebetween.

There are provided on the first portion 71A of the control chamber 71 the supply duct 13 connected with the accumulator 58 and the discharge duct 17 for circulating the hydraulic fluid discharged from the first portion 71A to the accumulator 58.

The first fluid-introducing valve 27 comprising a closed type electromagnetic change-over valve and a second fluid-introducing valve 28 comprising a flow rate-variable valve are disposed on the supply duct 13. A discharge valve 29 comprising a closed type electromagnetic change-over valve is disposed on the discharge duct 17. The reservoir 15 and the pump 16 are provided on the discharge duct 17 so as to circulate the hydraulic fluid discharged from the first portion 71A to the accumulator 58.

The operation of the hydraulic pressure control apparatus according to the seventh embodiment is described below.

When the traction control is not performed, the first fluid-introducing valve 27 and the second fluid-introducing valve 28 are closed and the piston 63 is at the unoperating position, namely, in the left in FIG. 7 due to the urging force of the first spring 75. In this state, the cutoff valve 72 is opened and thus the master cylinder and the wheel cylinder communicate with each other via the second portion 71B of the control chamber 71.

In the seventh embodiment, when the traction control is not performed, the first fluid-introducing valve 27 and the second fluid-introducing valve 28 are closed, and the first fluid-introducing valve 27 comprising the closed type electromagnetic change-over valve is interposed between the accumulator 58 storing a high-pressure hydraulic fluid and the second fluid-introducing valve 28 comprising the flow rate-variable valve. Accordingly, the hydraulic fluid does not leak from the second fluid-introducing valve 28.

Upon detection of the start of the spin of the wheel, the discharge valve 29 is closed and the first and second fluid-introducing valve 27 and 28 are opened. As a result, the hydraulic fluid of the accumulator 58 is supplied to the first portion 71A and thus the pressure of the first portion 71A rises. Consequently, the piston 73 moves to the left in FIG. 8 against the urging force of the first spring 75, and the sealing member 80 of the valve 78 closes the first port 74A, thus cutting off the communication between the master cylinder and the wheel brake.

With a further rise of the pressure of the first portion 71A, the piston 73 moves to the left in FIG. 8 while the piston 73 is compressing the second spring 79 and reducing the volume of the second portion 71B. As a result, the second portion 71B supplies the hydraulic fluid to the wheel brake, thus pressurizing the wheel brake.

In the seventh embodiment, when the traction control is performed, the flow rate of the hydraulic fluid supplied from the accumulator 58 to the second portion 64B can be continuously controlled and noises generated in this control operation are small because the second fluid-introducing valve 28 comprises the flow rate-variable valve.

Various modifications of the present invention is possible.

Figure 2:
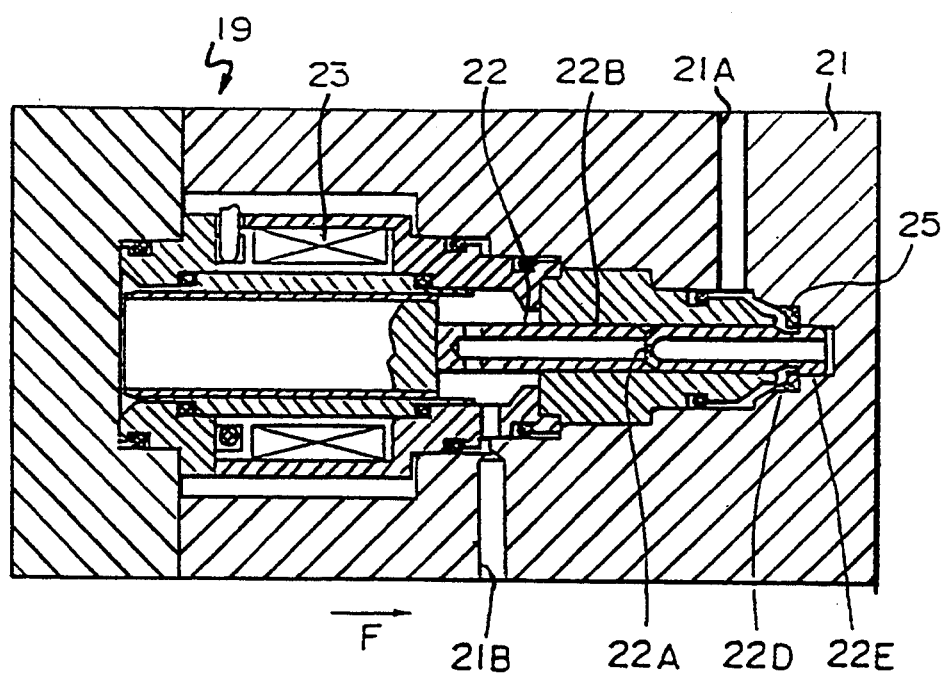
FIG. 2 is a schematic view showing a flow rate-variable valve.

In the second embodiment, the annular sealing member 25 and the shoulder 22E of the spool 22 constitute the variable orifice as the flow rate-variable valve as shown in FIG. 2. But the flow rate-variable valve may have a construction as shown in FIG. 9.

Figure 9:
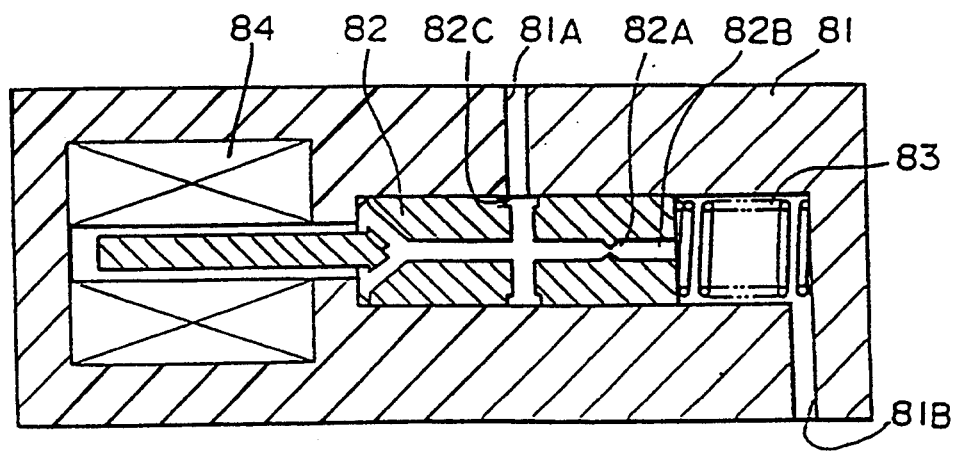
FIG. 9 is a schematic view showing another flow rate-variable valve according to the present invention.

In the flow rate-variable valve shown in FIG. 9, a sleeve 81 accommodates a spool 82, containing a duct 82B including an orifice 82A, urged by a spring 83 and an electromagnet 84. A passage 82C communicating with the duct 82B is formed on the surface of the spool 82.

An inlet port 81A communicating with the passage 82C of the spool 82 is formed in the sleeve 81, and an outlet port 81B communicating with the passage 82C is formed in the sleeve 81 with the orifice 82A interposed between the inlet port 81A and the outlet port 81B.

In this flow rate-variable valve, the spool 82 slides in the sleeve 81, thus communicating the inlet port 81A and the passage 82C with each other or cutting the communication therebetween repeatedly to form a variable orifice. The variable orifice maintains the difference in the pressure between both sides of the orifice 82A. Therefore, the intensity of electric current is adjustably supplied to the electromagnet to change the urging force applied by the spring 83 and the electromagnet 84. In this manner, the flow rate of the hydraulic fluid flowing from the inlet port 81A to the outlet port 81B can be successively controlled.

In the above-described embodiments, one flow rate-variable valve and one electromagnetic change-over valve are disposed in series on the supply duct or the discharge duct. But it is possible that one of a plurality of fluid-introducing valves or one of a plurality of discharge valves is composed of a flow rate-variable valve and the other is composed of an electromagnetic change-over valve. In addition, the flow rate-variable valve and the electromagnetic change-over valve are disposed in series on both the supply duct and the discharge duct.

In the above-described embodiments, the hydraulic pressure control apparatus is applied to the antilock brake hydraulic control apparatus or the traction control brake hydraulic control apparatus. But the hydraulic pressure control apparatus is applicable to various fluid-operated equipments such as a steering equipment, a suspension or the like installed on a car.

Although the present invention has been fully described in connection with the preferred embodiments thereof with reference to the accompanying drawings, it is apparent to those skilled in the art. Such changes and modifications are to be understood as included within the scope of the present invention as defined by the appended claims unless they depart therefrom.

What is claimed is:

1. A hydraulic pressure control apparatus comprising:
    a hydraulic source with a supply duct;
    a fluid introducing valve connected to said supply duct and connecting said hydraulic source with a control member of a fluid-operated device for controlling hydraulic pressure of the fluid-operated device; and
    a discharge valve connected to a discharge duct of said control chamber for discharging hydraulic fluid from the fluid-operated device,
    said fluid introducing valve being opened to increase the pressure of the fluid-operated device and said discharge valve being opened to decrease the pressure of the fluid-operated device, said fluid introducing valve and said discharge valve being disposed, respectively, on either side of said discharge duct, at least one of said fluid introducing and discharge valves including a flow rate-variable valve for continuously changing the flow rate of the hydraulic fluid according to the intensity of an electric current supplied thereto, and the other one of said fluid introducing and discharge valves including an electromagnetic change-over valve that is opened and closed based on an electric current supplied thereto.

2. A hydraulic pressure control apparatus as defined in claim 1, wherein said fluid-operated device includes a plurality of control chambers, said discharge duct being provided with a plurality of first discharge ducts each connecting said control chambers to each other and a second discharge duct with which the first discharge ducts are confluent, said discharge valve comprising a plurality of first discharge valves that each include a flow rate-variable valve and that are connected to each of the first discharge ducts and a second discharge valve that includes an electromagnetic change-over valve that is connected to the second discharge duct.

3. A hydraulic pressure control apparatus as defined in claim 1, wherein said fluid-operated device includes a plurality of control chambers, said supply duct being provided with a first supply duct connected to said hydraulic source and a plurality of second supply ducts branching from the first supply duct and connected to the control chambers, said fluid introducing valve comprising electromagnetic change-over valves that are disposed downstream of the first supply duct and flow rate-variable valves that are connected to each of said branched second supply ducts.

4. A hydraulic pressure control apparatus comprising:
    a discharge duct for discharging hydraulic fluid from a control chamber; and
    discharge valve means for opening and closing the discharge duct, wherein hydraulic pressure in the control chamber is reduced, said discharge valve means comprising a plurality of discharge valves that are provided in series, one of said discharge valves having a flow rate-variable valve for continuously changing the flow rate of the hydraulic fluid in accordance with the intensity of electric current supplied thereto, and the other of said discharge valves having an electromagnetic change-over valve that is opened and closed based on an electric current supplied thereto.

5. A hydraulic pressure control apparatus as defined in claim 1, wherein said fluid-operated device comprises a plurality of control chambers and a plurality of discharge ducts that are confluent with each other at a confluent point and that are connected with each of the control chambers, said discharge valve comprising a plurality of flow rate-variable valves that are interposed, respectively, between each of said control chambers and the confluent point, and an electromagnetic change-over valve that is disposed downstream of the confluent point.

6. A hydraulic pressure control apparatus as defined in claim 1, wherein said flow rate-variable valve comprises a sleeve having an inlet port and an outlet port, a spool slidably accommodated in said sleeve, and means for variably applying an electromagnetic force to urge said spool to move in at least one direction, the flow rate of the hydraulic fluid flowing from said inlet port to said outlet port being continuously changed as the applied electromagnetic force to urge said spool is variably adjusted by said applying means.

7. A hydraulic pressure control apparatus as defined in claim 6, wherein said spool includes a shoulder portion which comes into and out of contact with an annular seal member provided in said sleeve as said spool is moved, so as to form a variable size orifice for controlling the flow of fluid from said inlet valve to said outlet valve.

8. A hydraulic pressure control apparatus as defined in claim 6, wherein said spool includes a passage and an orifice for communicating said passage with said outlet port, said passage coming into and out of communication with said inlet port as said spool is moved, so as to form a variable size orifice for controlling the flow of hydraulic fluid from said inlet valve to said outlet valve.

9. A hydraulic pressure control apparatus as defined in claim 6, wherein said applying means comprises an electromagnet and means for adjustably supplying an electric current to said electromagnet to vary the electromagnetic force applied to said spool.

10. A hydraulic pressure control apparatus as defined in claim 4, wherein said flow rate-variable valve comprises a sleeve having an inlet port and an outlet port, a spool slidably accommodated in said sleeve, and means for variably applying an electromagnetic force to urge said spool to move in at least one direction, the flow rate of the hydraulic fluid flowing from said inlet port to said outlet port being continuously changed as the applied electromagnetic force to urge said spool is variably adjusted by said applying means.

11. A hydraulic pressure control apparatus as defined in claim 10, wherein said spool includes a shoulder portion which comes into and out of contact with an annular seal member provided in said sleeve as said spool is moved, so as to form a variable size orifice for controlling the flow of fluid from said inlet valve to said outlet valve.

12. A hydraulic pressure control apparatus as defined in claim 10, wherein said spool includes a passage and an orifice for communicating said passage with said outlet port, said passage coming into and out of communication with said inlet port as said spool is moved, so as to form a variable size orifice for controlling the flow of hydraulic fluid from said inlet valve to said outlet valve.

13. A hydraulic pressure control apparatus as defined in claim 10, wherein said applying means comprises an electromagnet and means for adjustably supplying an electric current to said electromagnet to vary the electromagnetic force applied to said spool.

* * * * *